May 29, 1928.  
E. M. BROGDEN  
1,671,923  
ART OF TREATING FRUIT AND THE LIKE  
Filed Aug. 1, 1922  
3 Sheets-Sheet 2
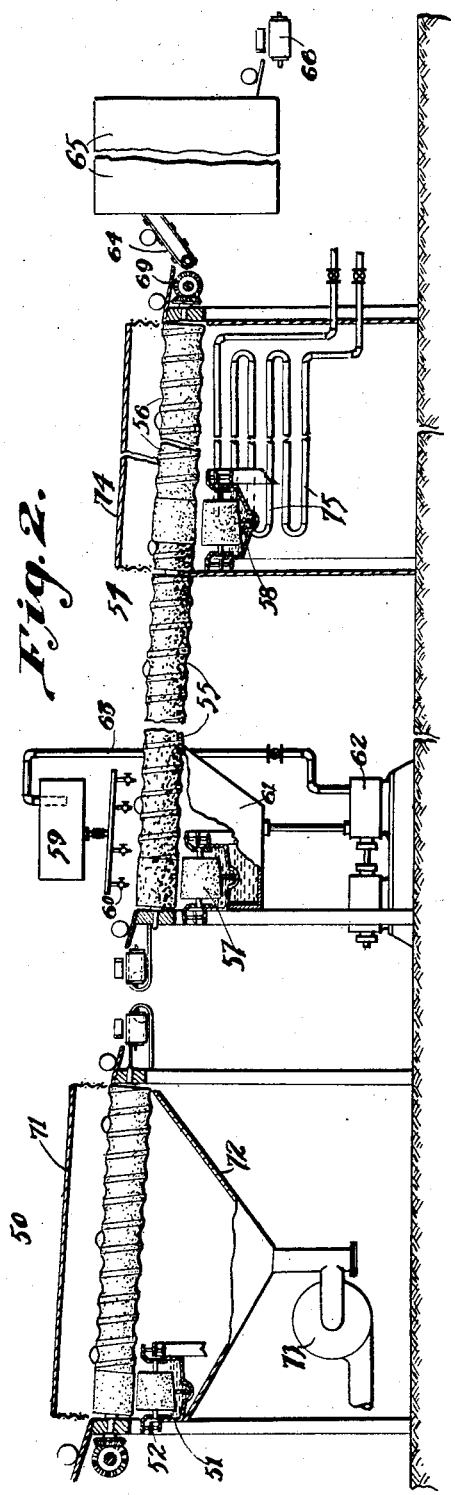
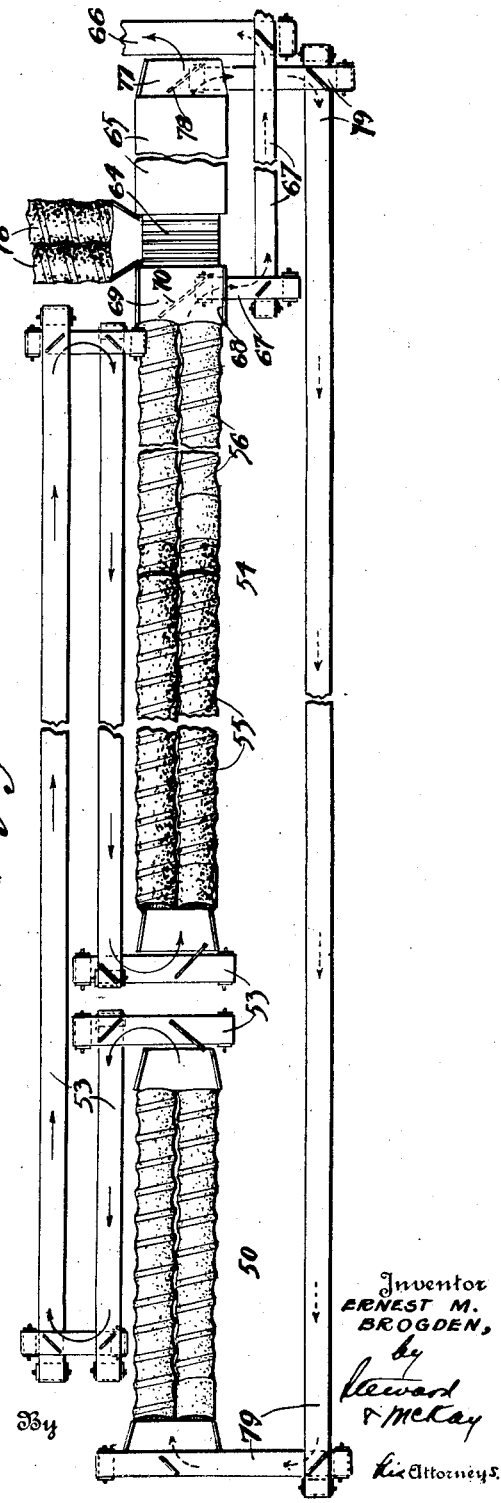

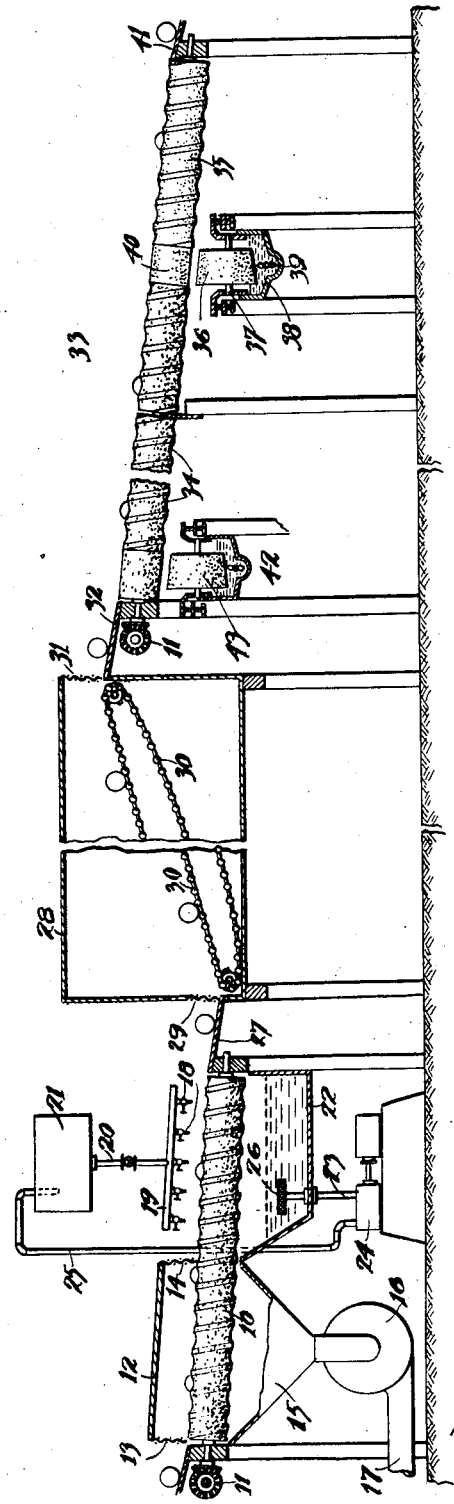

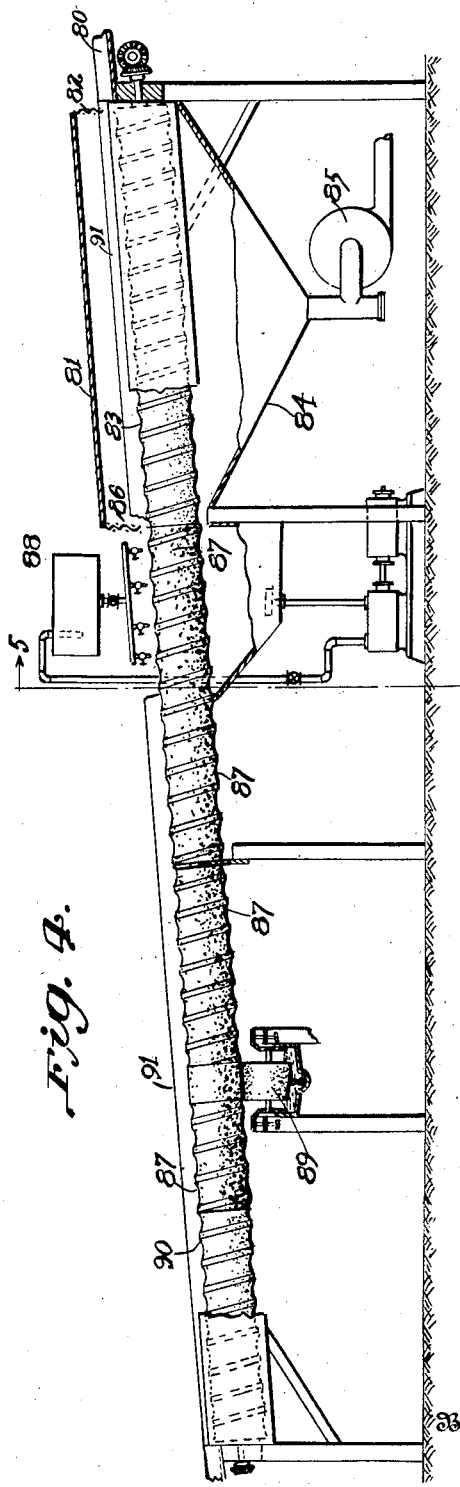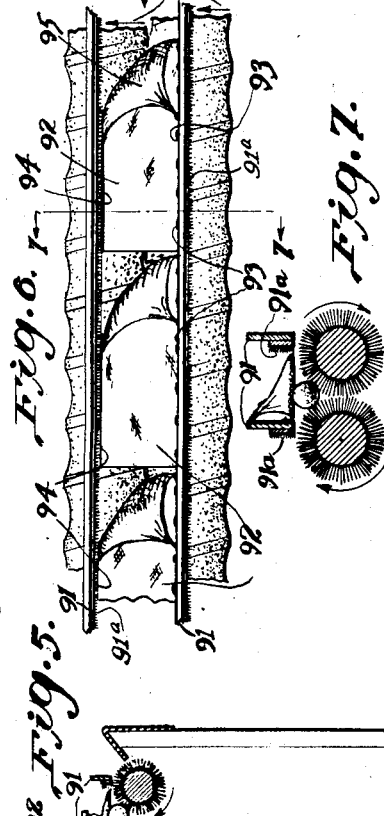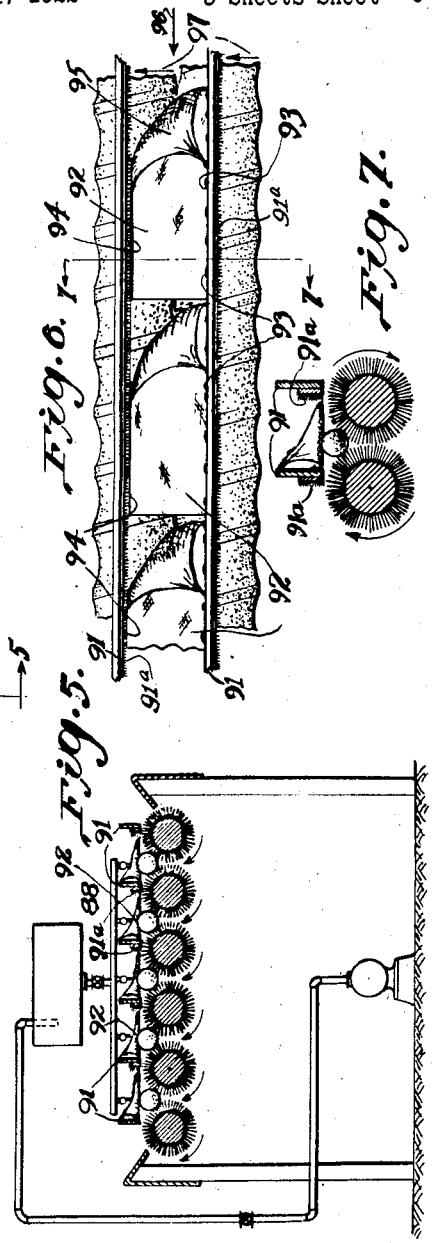

Patented May 29, 1928.

1,671,923

UNITED STATES PATENT OFFICE.

ERNEST M. BROGDEN, OF WINTER HAVEN, FLORIDA, ASSIGNOR TO BROGDEX COMPANY, OF WINTER HAVEN, FLORIDA, A CORPORATION OF FLORIDA.

ART OF TREATING FRUIT AND THE LIKE.

Application filed August 1, 1922. Serial No. 579,052.

This invention relates to art of treating fruit and the like; and it is concerned more particularly with processes of and apparatus for preparing fresh fruits and vegetables for market.

The invention is of especially great utility in the preparation of fresh citrus fruits such as oranges, grapefruit, lemons, etc., for market, and this phase of the broad invention will therefore be referred to hereinafter by way of a concrete illustrative example embodying the fundamental principles involved. It is to be understood, however, that in its broader aspects the invention contemplates the treatment of other fruits, such as apples, peaches, cantaloupe, etc. and also vegetables such as cucumbers that can be similarly handled to advantage. The term fruit as employed in the appended claims is therefore to be construed, unless otherwise indicated, broadly enough to include both fruits proper and vegetables.

According to modern methods of packing and shipping citrus and other fruits for market, it is essential that the fruit as it is received at the packing house from the grove or orchard be subjected to a cleansing treatment of some kind for removal of foreign matter such as dirt, scale, "smudge," or the like, from the surface thereof. The term "smudge" is commonly applied to the smoky discoloration or deposit commonly appearing on fruit from groves that are heated by crude oil heaters. After superficial foreign matter has been removed so far as is practicable, the fruit may optionally be rubbed and polished on polisher rolls, and is subsequently graded, sized and packed in boxes or crates for shipment, all these latter operations being in a broad sense well-known and more or less standard in practice. Heretofore the preliminary cleansing of the fruit has been accomplished in accordance with either one of two general methods. According to one method which was commonly in vogue in the citrus fruit industry some years ago, the fruit as it was received at the packing house was subjected to the rubbing action of rotating dry cylindrical brush rolls without the application of water to assist in the cleansing. This method of dry brushing was often not particularly effective to completely cleanse the fruit, and in time it was superseded by the second general method which has since been almost universally employed. According to the second method, water is applied to the fruit in the cleansing operation. A common practice is to dump the received fruit into a tank or vat of water known as the soaking tank, from which it is conveyed into a fruit-washing machine consisting essentially of rotary bristle brushes of Tampico fiber or the like where the fruit is given a vigorous rubbing and at the same time is sprayed with jets of water. After passing through the washing machine, the fruit must then be carefully dried to remove all surface moisture as far as possible, in order to avoid favoring growth of mold and other fungoid organisms on the fruit. Accordingly the wet fruit coming from the washer is passed slowly through a long drying chamber or kiln where it is subjected to currents of air, preferably warmed slightly, and the superficial moisture is thus removed as far as possible. This second method is usually more effective than the dry brushing method, so far as concerns removal of dirt and the like from the fruit; although even from that standpoint it is not always satisfactory. In the case of scaly and smudged fruit particularly, satisfactory cleansing is not attained. Furthermore, the method of washing with water has the serious disadvantage that proper drying of the washed fruit is not always attainable. Sometimes this is because the drying apparatus employed is not working well or is being overloaded; and sometimes it is because prevailing atmospheric conditions make effective drying of wet fruit practically impossible under any circumstances. Under the most favorable conditions, the drying operation usually fails to remove the water that gets in under the calyx at the stem end. Another serious objection to washing with water, even under the most favorable conditions, is that it provides an ideal medium for developing mold and rot organisms and for inoculating sound and uninfected fruit therewith. The ordinary run of fruit as it comes to the packing house almost always includes fruit infected with mold or rot, and the mold and rot organisms from such fruit accumulating in the water in the soaking tank are thus distributed in active or virulent condition to all the fruit handled. As such organisms thrive and multiply at an enormous rate in a moist environment, the subsequent inability to dry the water-washed fruit in a thoroughly dependable manner eventually causes considerable loss through the molding and rotting of fruit that was perfectly sound and free from infection when it was originally delivered to the packing house. In this connection, it is to be borne in mind that the brushing or scrubbing of the fruit in the washing machine necessarily abrades the surface of the fruit somewhat, even if only to a comparatively slight degree, thus removing some of the natural protective material from the rind or skin and affording places of lodgment and attack for bacteria and other organisms. These localities being moistened in the washing process, they thus provide excellent culture media inoculated with destructive organisms. Furthermore, a certain proportion of the fruit as it comes from the grove shows clipper cuts or other wounds mechanically inflicted upon it in the picking and handling in transit to the house. Such wounds are pretty well dried out by the time the fruit is delivered to the packing house and is ready to run through the handling machinery, but the use of water in washing moistens them again, and thus exposes them to inoculation by the organisms present in the wash water and in the air.

In accordance with recent developments in the practice, the handling of the fruit by the packer has also included applying to the washed fruit a thin coating of suitable preservative material which has the effect of sealing the surface of the fruit in such manner as to prevent its withering or shrinking, to protect it against external infection by mold or other decay organisms, and otherwise to maintain the fruit in substantially the same plump, fresh and fine flavored condition in which it was picked from the tree. In a specific embodiment, this recently developed treatment of the fruit consists in a proper application thereto of a mixture of paraffin and a relatively light and reasonably volatile solvent vehicle, such as a light petroleum distillate or fraction, the mixture being applied to the fruit after it has been washed and has passed through the drier and the application being effected in a suitably controlled manner, usually by means of rotary horsehair brushes similar to the standard polishers in common use heretofore for polishing the fruit after drying and prior to grading and sizing. This method of applying a preservative composition to citrus and other fruits is fully described and claimed in prior applications filed by myself and co-pending herewith. Said method has proved generally satisfactory and of great value in the fruit industry; but one difficulty which has been encountered in some instances and which has occasionally caused trouble has been due to the fact already emphasized, namely, that in spite of all precautions it has sometimes been found practically impossible to attain the requisite thorough surface drying of the washed fruit that is to receive the preservative coating. Under these conditions the beneficial effect of said coating is diminished and may even be eliminated. Since fruit treated by the water-washing process is practically certain to become infected during the operation whether it was originally infected or not, application of a preservative coating of paraffine or the like to such fruit that is insufficiently dried simply covers up the undesirable organisms in a moist environment without necessarily preventing their development and growth. In this connection it is also to be noted that the air blown on the wet fruit going through the drier is apt to be loaded with blue mold spores and the like, which are thus deposited on the fruit surface, ready to develop and ruin the fruit at the first opportunity.

Accordingly, one of the principal objects of the present invention is to do away wholly or largely with the employment of water as a cleansing medium for citrus and other fruits in packing house practice, and at the same time to effect the cleansing in a more complete, satisfactory and reliable manner than has been possible heretofore. A further object of the invention is thereby to ensure that the fruit be in especially favorable condition to receive a coating of preservative material of the general character hereinabove referred to, and thus to enhance the effectiveness of said coating as a preservative agent. A further object is to provide a rational and systematic method of handling fruit in the packing house whereby to attain thoroughly cleansed and properly coated fruit or the like which is much less likely to be infected and damaged by decay organisms than has been the case heretofore, and which shows remarkable resistance to shrinkage or withering and retains its original freshness and flavor substantially unimpaired for relatively long periods of time.

With the foregoing objects in view and others which will become apparent as the description proceeds, the invention consists in the novel process, process steps, and apparatus which will first be hereinafter explained and described as embodied in certain specific and highly desirable practical embodiments of the broad principles of the invention, and will then be more particularly pointed out in the appended claims.

In general the novel process of the invention comprises the cleansing of fruit, using the term in the broad sense hereinbefore pointed out, and more particularly the cleansing of citrus fruits, with the aid of a non-aqueous liquid of such character as to be unobjectionable in its effect upon the fruit itself; such cleansing being most advantageously associated with or followed by treatment of the fruit with a protective or preservative coating material.

The use of such a non-aqueous cleansing liquid obviates the necessity for employing water at any stage of the handling and packing of the fruit in preparation for market, while at the same time it enables a very much more thorough and effective cleansing of the fruit to be attained than is possible by either dry-brushing or water-washing. If the non-aqueous liquid washing medium employed is compatible to at least some extent with the oils and waxes present naturally in small quantity on the surface of untreated fruit, which is most desirable for the purposes of the present invention, there is a further enhanced effect due in part to this compatibility. That is to say, discoloration, "smudge," scale (purple or red), and other foreign matter that is ordinarily removable only with the greatest difficulty, if at all, by water-washing, even when the use of warm water containing soap, lye or the like, is resorted to, can be effectively removed with comparative ease by employing a non-aqueous solvent of the compatible character just mentioned. As examples of such compatible non-aqueous liquid mediums may be mentioned particularly certain relatively light petroleum fractions such as kerosene or certain parts of the usual kerosene fraction, for example. Ordinary commercial kerosene gives good results in many cases; but for use in treating oranges and grape fruit I have found it desirable to use a more highly refined fraction, as will hereinafter appear. It is to be understood, however, that the invention is not limited to the employment of any specific non-aqueous liquid as the washing or cleansing medium for fruit; but that on the contrary any non-aqueous liquid, more particularly a fairly light and reasonably low-boiling oil, that is unobjectionable in its effect upon the fruit and that acts, especially by its solvent power, to assist in removing foreign matter therefrom when properly employed in accordance with the invention, is capable of use in this connection.

From reference to the washing liquid as non-aqueous, it is not to be inferred that, in the broadest aspects of the invention, the absolute exclusion of all water or moisture from the liquid is necessarily meant. The term non-aqueous is herein used to designate a liquid that is either wholly free from water or that contains or is associated with so little water that application of the liquid to fruit imparts thereto no substantial or undesirable quantity of moisture. The non-aqueous washing liquid may be immiscible with water; or it may be miscible with water to a greater or less extent and may even tend to take up water from the fruit, or atmosphere, or both, during prolonged use as a washing medium, but it does not thereby cease to be a non-aqueous washing medium in the sense intended herein.

As before stated, kerosene, or a petroleum fraction of somewhat similar characteristics, is a typical non-aqueous liquid medium suitable for the purposes of the present invention, and it has given satisfaction in practice. A liquid of this character will not dissolve water or mix therewith in more than relatively small proportions and hence never contains more than a small percentage of moisture at the most; but it may aid in freeing articles from water when applied thereto. Ordinary commercial kerosene can be used successfully in practicing the process of the invention, as before pointed out; but if the kerosene is specially treated by means of suitable chemicals to thoroughly neutralize it and also to deodorize it to some extent, or if a special kerosene-like fraction of a type to be more particularly referred to hereinafter be provided, such product is still more satisfactorily as a fruit-washing medium, and at present I consider such product to be particularly well adapted for use in practicing my invention. It is not essential that the washing medium consist solely of kerosene or other analogous non-aqueous solvent. If desirable or convenient, the washing medium may contain also other ingredients dissolved in or mixed with the non-aqueous liquid or solvent. Thus, the medium may include waxy material such as paraffin wax, for example, dissolved in or mixed with the kerosene or other liquid in proportions that may vary within reasonably wide limits. Such a mixture not only serves as a cleansing agent or medium but also functions at the same time to fill up scratches or other abrasions and to provide the fruit with a thin coating or sealing film of waxy material of a character adapted to preserve the fruit in fresh and sound condition, as hereinbefore explained. Moreover, I find that the presence of waxy material in the cleansing medium seems to assist at a later stage of the process in enabling ready removal of dirt from the fruit by the brushes. The cleansing medium whether containing waxy material or not, may also include ingredients adapted, for example, to modify or mask the odor of the solvent, to alter the color of the medium, and so on. For example, the addition to kerosene or the like of a small amount, say ½ to 1 per cent of amyl acetate, hexyl acetate, or other ester or essential oil having a pleasant odor, is useful for modifying the odor of the solvent. The addition of a small percentage of coloring matter, say ¼ of 1 per cent of dandelion oil, anatto, or other butter color or other harmless color, serves to tint the composition as may be desired. Adding larger percentages, say 2 to 5 per cent, deepens the color of pale fruit somewhat, which is not objectionable in the case of oranges. Such additional ingredients are not essential, however, and may be omitted.

Within the broad scope of the invention, various specific ways of applying the non-aqueous liquid medium to the fruit for cleansing the same may be employed. Where said medium consists wholly or largely of the solvent employed, the efficient cutting or solvent action rapidly loosens scale, smudge and other adherent foreign matter from the surface of the fruit and renders it easily removable by brushing or other appropriate means. The preservative coating material, such as paraffin wax or the like, with which the fruit or vegetables are to be eventually thinly coated, may or may not be applied thereto in association with the same non-aqueous liquid employed to cleanse the fruit. Where said coating material is not associated with said liquid or solvent in the cleansing step proper, the cleansing liquid may be applied to the fruit substantially pure, either by dipping the fruit therein, spraying it upon the fruit, rubbing it upon the fruit by means of brushes or the like, or by combining any or all of these methods of application. The paraffin or other waxy coating material may then be applied to the fruit after the initial treatment with the substantially pure non-aqueous washing liquid has been employed to remove adherent foreign matter to the desired or necessary extent. In whatever specific form the novel process is carried out, it is desirable that the conditions of operation be such as to afford the non-aqueous solvent an opportunity to exercise its cutting and loosening function upon the adherent foreign matter and thus to enable ready removal thereof as by rubbing or brushing at a stage succeeding the initial application of the solvent or solvent-containing mixture to the fruit.

In an especially desirable practical embodiment of the novel process, the fruit or vegetables are subjected at the outset to a dry-brushing treatment before applying thereto the non-aqueous washing liquid or mixture thereof with a coating agent. This initial treatment by dry-brushing serves to knock off or otherwise dislodge the bulk of the dust and other loosely adherent particles of foreign matter which can thus be prevented from unnecessary contaminating the non-aqueous washing liquid or mixture. While this initial dry-brushing is not essential to the successful practice of the invention in all cases, it is nevertheless distinctly desirable in many instances, and in practice it is recommended for employment in combination with the later steps in the treatment described.

From the foregoing, certain marked advantages will be seen to inhere in my novel process of cleansing fruit by waterless washing. Since no water is used, the difficulties of thoroughly freeing the fruit from moisture after washing, as well as the dangers resulting from failure to do so, are entirely avoided; one of the most potent agencies for inoculating fruit with mold, rot and the like is thus eliminated; the apparatus installation for handling the fruit may be substantially reduced in size and cost; and the whole system of fruit-handling is simplified and rendered more efficient and economical. It may be noted further that the non-aqueous liquid or solvent employed alone or in mixture with waxy material as the cleansing medium may, and in most cases apparently does, act to superficially dry or dehydrate the fruit rind or skin somewhat beyond the degree of dryness normally characterizing it under the atmospheric conditions prevailing at the time the fruit is treated. This of course tends still further to discourage bacterial and fungous growth on the fruit rind. Since no water is applied to the fruit, the clipper-cuts, thorn-pricks and other wounds, which are dry when the fruit reaches the packing house as before stated, are not moistened and thus rendered good culture media for infecting organisms, as is the case when fruit is washed with water. The only liquid that touches the fruit when it is handled in accordance with my novel process in its best form is a non-aqueous solvent, with or without admixed paraffine or the like. Blue mold spores, rot, and other destructive organisms cannot develop or grow in such a medium, nor can they in the thin waxy coating that finally remains on the fruit after the solvent has wholly or largely disappeared. Deprived of air and moisture, both of which are essential to the development of such organisms, they are unable in such an environment to make any headway. Due also to the absence of water or sensible moisture from the fruit rind, there is nothing to repel and prevent the mixture of non-aqueous solvent and waxy preservative material from making effective contact with the fruit rind at all points, and therefore a more perfect and reliable protective coating of waxy material can be obtained than is otherwise possible.

In order to afford a full understanding of the principles underlying the invention, but without intending thereby to limit the invention to the particular details disclosed, certain practical embodiments of the novel process found especially desirable in treating fruit, together with novel apparatus suitable for carrying out the process, will now be described in detail by way of a concrete illustrative example. Practical forms of such apparatus are shown more less diagrammatically in the accompanying drawings, wherein Fig. 1 is a view in side elevation of an apparatus assemblage constructed and arranged in accordance with the invention, parts being shown broken away and in section;

Figs. 2 and 3 are views in side elevation and plan, respectively, of another arrangement of apparatus that can be used to special advantage in practicing the process under some conditions, parts of the apparatus being shown broken away and in section;

Fig. 4 is a view in side elevation of another type of apparatus in which means for performing a series of operations in the process are embodied in a unitary construction;

Fig. 5 is a transverse section on the line 5—5 of Fig. 4;

Fig. 6 is a fragmentary section showing details of a portion of Fig. 5; and

Fig. 7 is a fragmentary section on the line 7—7 of Fig. 6.

In one practical way of carrying out the novel process for cleansing and preservative treatment of citrus fruit, such as oranges, grapefruit, lemons or the like, I first subject the fruit as it is received at the packing house to a dry rubbing or brushing to remove from the surface such dust, dirt and other foreign matter as is not too firmly adherent to be brushed or knocked off in this way. This initial treatment is effected without the assistance of water or other liquid. It is intended only as a comparatively rough mechanical cleaning preliminary to treatment with the non-aqueous cleansing or solvent agent, by means of which loosening and removal of scale, smudge, and other tenaciously adherent foreign matter are made feasible. In case the fruit is comparatively free from scale or smudge, however, this dry brushing may constitute the major part of the cleansing operation proper.

Following the preliminary dusting by the dry brushes, the fruit enters the second stage of the process in which it is subjected to the action of a non-aqueous washing medium. In this specific instance, the non-aqueous washing medium may consist of a relatively light oil fraction distilled from petroleum. One light oil that gives excellent results is characterized by a gravity of 42°-44° Baumé, an initial boiling or distillation point of approximately 360° F., an end boiling point of approximately 486° F., and a flash point of about 149° F. It will be noted that while this oil has a fairly high flash point and is but slightly volatile at ordinary temperatures, its distillation range is comparatively narrow, characteristics which are especially desirable for the purposes of the present invention.

This non-aqueous washing medium is thoroughly rubbed all over the surface of the fruit. The effect is to dissolve or loosen scale, smudge, and other adherent foreign matter that was not removed in the preliminary dusting operation, and to render the same removable with comparative ease. If this second stage of the treatment is carried out with the aid of rotary brush means or the like, removal of foreign matter is effected to some extent simultaneously with the application of the non-aqueous composition to the fruit. In any case, it is desirable that the non-aqueous solvent be afforded sufficient opportunity to effect its cutting and loosening action on the scale, etc. to ensure the latter's being eventually removed to the fullest extent practicable; and accordingly, in the next or third stage of this particular embodiment of the process, the fruit carrying the non-aqueous washing medium spread thereover is permitted to remain in a relatively quiescent state for a predeterminable period of time to facilitate such loosening and cutting action prior to the final brushing and rubbing given in the following or fourth stage to be described presently. In the third stage, therefore, the treated fruit may be carried quietly for a suitable period of time on a suitable conveyor. This may be an ordinary canvas belt conveyor, for example; or the fruit may be passed through some kind of a chamber or kiln, such as a fruit drier of any well known or suitable type.

In the fourth stage of the particular embodiment of the novel process under consideration, the fruit is subjected to further brushing and rubbing, preferably by means of rotary brush mechanism, which has the effect of removing further scale, smudge, etc., that may have resisted the action of the brushes in the second stage of the process. In the latter part of this fourth stage, a mixture of the aforesaid or other suitable non-aqueous solvent with paraffin or the like is applied to the fruit to provide it with a very thin protective layer or film of waxy material.

After this fourth stage of the treatment, the fruit may be graded and sized in the usual way, which operations are well known and require no description here. A certain amount of the solvent may still remain in mixture with the paraffin on the surface of the fruit, but experience has shown that, assuming the employment of a proper solvent, this does no harm; and since the solvent gradually evaporates, there is no trace remaining when the fruit reaches market.

Fig. 1 illustrates apparatus suitable for carrying out the novel process in the four-stage embodiment just outlined. At 10 are shown the conventional spirally formed rotary brush rolls of an ordinary fruit washer being modified in accordance with the principles of this invention to adapt it for carrying out the novel process. Gearing for driving said rolls is indicated at 11. Approximately the upper half of the inclined rolls 10 is used in this instance as mechanical dusting brushes to carry out the first stage of the process. This upper portion of said rolls is enclosed by a cover or housing 12, into the upper end of which fruit can enter through a flexible closure 13 which may consist of a flap of canvas or the like, a similar flexible closure 14 permitting the fruit to leave the lower end of the housing. Dust and dirt fall into the hopper 15 and are drawn therefrom by exhaust fan 16 and discharged to any convenient place through pipe 17.

Approximately the lower half of the inclined rotary brush rolls 10 is used in the second stage of the process to assist in applying the non-aqueous washing medium to the fruit and to distribute the same thereover. Arranged above this lower portion of the inclined rolls 10 are a plurality of valved pet-cocks or other jet devices 18, connected by suitable pipes 19 and 20 with the tank 21 containing a supply of the washing medium. Fruit leaving housing 12 through the flexible exit 14 and continuing to travel down the runways provided by each pair of said rolls, of which there may be any convenient number, is at once thoroughly smeared with the washing oil through the action of the rolls which spin the fruit on varying axes and thoroughly brush and rub the surface thereof. The brushing surfaces of said rolls may advantageously consist of Tampico or other relatively stiff fiber of suitable character such as is commonly employed in fruit-washing machines. Any excess of the non-aqueous medium over what is required to thoroughly cover the fruit and to saturate the lower half of the rotary brushes 10 is received in a tank 22 from which it may be drawn through pipe 23 by pump 24, and returned through pipe 25 to the supply tank 21 for re-use. Access to the intake end of pipe 23 may be by way of a suitable strainer or filter indicated conventionally at 26.

The fruit after being dusted and then treated with solvent on the rolls 10, now rolls down the chute board 27 and enters a drier or solvent evaporator indicated conventionally at 28 to undergo the third stage of treatment, entry into said drier being effected through the canvas flap doorway 29. The drier here shown is a simple form of a standard type in common use for other purposes. The fruit travels rather slowly through the drier, being carried on the roller belt conveyor indicated at 30, and finally leaves through flexible exit 31. During this travel of the fruit through the drier chamber, it is not necessary, generally speaking, to subject the fruit to currents of air, the main object at this stage being to allow ample time for the washing oil to cut and loosen scale, smudge and the like that may be on the fruit. Accordingly, if the drier happens to be equipped with fans, as is usual, it is ordinarily not necessary to operate them in carrying out the novel process.

The fruit next rolls down over chute board 32 and is delivered to the upper end of inclined rotary brush roll apparatus indicated generally at 33 and enters the fourth stage of the process. The brushing surfaces of the upper portion of the brush rolls, indicated at 34, consists most desirably of relatively stiff bristles of fiber such as Tampico, while the lower portion 35 is of softer character, bristles of horse hair, or mixed horsehair and Tampico fiber, providing brushing surfaces for this lower portion of the rolls. During passage of the fruit down the runways provided by the rolls, of which there may be any suitable number cooperating in pairs in the usual manner, scale, smudge or the like, that has been loosened by the cutting action of the non-aqueous solvent in passage of the fruit through the drier, is dislodged and knocked off by the upper part 34 of the brushes. As the fruit strikes the lower section 35 of the inclined rolls, a mixture of a non-aqueous liquid and paraffin or other suitable preservative coating material is applied to it by means of a composition-applying device comprising, in this instance, a rotary applicator brush roll 36 carried upon vertically adjustable bearings 37 mounted on the wall of a tank or reservoir 38 containing said mixture. Suitably driven agitating means, indicated at 39, may be provided to maintain the composition properly mixed or emulsified. When the roll 36 is adjusted for engagement with the roll section 35, as illustrated, it is driven by said roll; and, dipping into the coating composition therein, it continually transfers portions of the latter to the brush roll sections 35, which rub it thoroughly over the fruit. The portion 40 of the roll section 35, with which the applicator roll engages, may advantageously be plain instead of spirally grooved.

The composition used in the applicator reservoir 38 may consist, in a typical instance, of about 45 to 55 parts of paraffine to about 55 to 45 parts of the aforesaid relatively light oil solvent used in the first stage of the process, parts being by volume.

The fruit finally leaves the lower end of the brush roll apparatus 33 and is discharged over chute board 41, either to a solvent-evaporator (not shown) or, and more commonly, directly to the usual grading and sizing mechanism unnecessary to describe here.

It will be noted that by reason of the fact that the light washing oil employed in the first stage of the process is not excessively volatile, there need be comparatively little loss of solvent in passing through the chamber 28, and accordingly there is full opportunity at this stage for the solvent to exercise its proper function of cutting or dissolving tenaciously adherent foreign matter such as scale and smudge. However, by reason of the fact that the end or final boiling point of said light oil is comparatively low, sufficiently complete evaporation of said oil after the fruit has been delivered from the brush roll apparatus 33 takes place with reasonable promptness, whether or not such evaporation be hastened by passing the finished fruit through a solvent evaporator.

In the apparatus illustrated in Fig. 1, a second applicator device, designated generally at 42, which may be of the same type already described, is shown located adjacent the upper end of the brush rolls 34. When the apparatus is being used to carry out the process in the manner just described, the applicator device 42 remains idle. However, under some circumstances it may be desirable to alter the mode of procedure somewhat as, for example, where the character of the fruit is such that such change in procedure would be advantageous or convenient. For instance, if the fruit as received at the packing house is substantially free from scale, smudge, or other tenaciously adherent foreign matter, and is merely dusty, it is usually unnecessary to treat it with the pure washing oil or solvent before applying the mixture of paraffin and solvent. Accordingly, when such fruit is to be treated in the apparatus of Fig. 1, the adjustable applicator roll 43 of applicator 42 may be raised into engagement with roll section 34, while applicator roll 36 is lowered and remains idle. The pet-cocks or nozzles of the devices 18 may be closed and the pump 24 remains idle. The rolls 10 now merely serve as dry brushing or dusting rolls, and the roller conveyor belt 30 serves merely as a convenient means for transferring fruit from the rolls 10 to the brush roll apparatus 33. Upon being delivered to the upper ends of the brush rolls of apparatus 33, the fruit is immediately daubed with coating composition transferred from the reservoir of applicator 42 to said brush rolls, and during the remainder of its travel down the runways between said brush rolls, said composition is thoroughly distributed and rubbed over the surface of the fruit, so that by the time it is discharged over the chute board 41, the fruit has received the desired thin film coating of protective material. In view of the fact that the fruit as it is delivered to the brush rolls of apparatus 33 is entirely free from solvent, under the conditions assumed, it is desirable that the composition employed in the applicator 42 be of somewhat thinner consistency than that described as used in applicator 36, 37, etc. The thinner composition may consist, for example, of say 35 to 40 parts of paraffin to 65 to 60 parts of the aforesaid light oil fraction or other suitable non-aqueous liquid; and in some cases a still thinner mixture is permissible.

Provision of the second applicator device 42 also adapts the apparatus for use in treating separated fruit, that is, fruit that has been run through a separator to separate it from frozen fruit. The separators in common use employ water as a flotation medium, and accordingly economical handling of such fruit practically makes it necessary to wash it with water since it is already wet. In order to treat such fruit in the apparatus shown in Fig. 1, the non-aqueous washing medium contained in the tank 22 can be replaced by water which is pumped through the pet-cocks 18 and sprayed upon the fruit in the usual way as it passes down over the lower sections of rolls 10. The wet fruit is then delivered to the apparatus 28 which may be operated under these circumstances as a regular drier or evaporator, air being blown in the usual manner upon the fruit as it is carried through the apparatus by the roller conveyor belt 30. After it passes through the drier, the fruit is then delivered as before to the brush roll or polisher mechanism 33 where a preservative coating composition is applied to it through the agency of applicator 42. Applicator 36 is idle under these conditions.

It will be seen therefore that the apparatus arrangement shown in Fig. 1 and above described is very convenient from the standpoint of ready adaptation for treatment of fruit in different ways as may be required.

In another practical embodiment of my invention I may make use of the novel apparatus arrangement shown more or less diagrammatically in Figs. 2 and 3. The apparatus shown in these figures is especially advantageous because of the fact that, like the apparatus previously described, it is readily adaptable or convertible to handle fruit of different character or condition upon short notice, and also because it lends itself particularly well to installations where for any reason it is necessary or desirable to utilize previously installed fruit-handling units to the fullest extent possible. At the same time, the essential parts of this system can be installed, without reliance upon previously installed apparatus, at minimum cost. Furthermore, the floor space required is much less than that required by fruit-handling systems heretofore used.

Generally described, the apparatus of Figs. 2 and 3 involves an arrangement analogous to that of Fig. 1 in that it comprises a unit for cleansing fruit, partially or completely, without the use of water, a second unit, which may be called the delay unit, receiving fruit from the first unit and normally maintaining the same in a relatively quiescent condition for a predeterminable period of time, and a third unit in which any necessary further cleansing of the fruit may be accomplished and in which the fruit receives what may be called a finishing treatment so far as application of the preservative coating composition is concerned. From the apparatus comprising these three principal units, the fruit may optionally go through a drier unit for partial or substantially complete removal of residual volatile solvent present in the preservative coating, the fruit then passing from said drier unit to the usual grading belt or other device for grading fruit, and then to sizing apparatus. However, in many cases, the employment of the drier unit is not essential, and it is an important feature of the invention that the fruit as discharged from the third unit above referred to may go direct to the grading belt without passing through said drier unit. The arrangement shown and hereinafter to be more particularly described is especially advantageous because, among other things, it can be adapted with exceptional facility for use where for any reason it may be desired in a particular instance to use water in washing the fruit. Under such circumstances, provision is made whereby the fruit, after being handled first in the usual fruit-washer employing water, is delivered to the drier unit aforesaid; is then delivered to the first unit above described which now serves, not as a cleansing unit, but as a composition-applying unit; passes thence to the second unit where more or less evaporation of the hydrocarbon or other solvent employed may take place; goes thence to the third unit for the finishing treatment; and finally passes from said third unit to the grading belt. In handling water-washed fruit, it is also possible to cut out either the first or third unit, and also the second or delay unit.

Referring now to the details of the apparatus shown in Figs. 2 and 3, 50 designates generally the first unit above referred to, this unit comprising inclined rotary brush roll apparatus of the so-called polisher type and comprising in practice any suitable number of parallel inclined spirally grooved rotary brush rolls, but here illustrated for simplicity as consisting of two such rolls cooperating to provide a single fruit runway. This fruit unit is adapted and normally used, when the fruit is merely dusty and does not carry scale or smudge, to clean the fruit merely by dry brushing or dusting the same. On the other hand, when the fruit is also scaly or smudged, this unit can be operated to cleanse the fruit with the aid of a non-aqueous liquid medium consisting either of a non-aqueous solvent such as kerosene or other suitable light oil alone, or a mixture thereof with a suitable proportion of preservative coating material such as paraffin. In order that the latter method, that is, washing with a non-aqueous liquid medium, may be employed if desired, the unit is provided with an applicator indicated generally at 51, of which the applicator roll 52 is adjustably mounted so that it can be moved into or out of engagement with one or more of the superadjacent brush rolls, the arrangement being similar in all essential respects to the applicators described in connection with Fig. 1. If a mixture of paraffin and solvent is used as the washing medium, which sometimes offers practical advantages over cleansing with the solvent alone, the mixture should ordinarily be comparatively thin. A typical mixture that can be effectively used in container 51 for this purpose comprises 20 per cent by volume of paraffin and 80 per cent by volume of a liquid hydrocarbon such as kerosene or other suitable light oil. In a typical installation, the brush rolls of this cleansing unit 50 may be about 5 or 6 feet long, their brushing surfaces consisting of mixed bristles of horsehair and Tampico fiber in about equal proportions.

Fruit leaving the first unit passes to the conveyor belt system indicated generally at 53, said system being such as to convey the fruit over a circuitous route whereby a predeterminable period of time may elapse before the fruit is delivered to the third or finishing unit indicated generally at 54. The propelling mechanism for said conveyor belt may be geared for operation at any one of several different predetermined speeds in order that said period of time may be altered to suit different conditions. The conveyor belt unit 53 delivers the fruit to the aforesaid finishing unit 54 which is similar in general character to the first unit, 50, in that it consists of inclined parallel spirally grooved brush rolls which, however, are most desirably considerably longer than the brush rolls of unit 50. The first or upper portion 55 of the brush rolls of unit 54 are best provided with relatively stiff brushing surfaces and therefore can in practice be composed of Tampico fiber bristles. The second or lower portion, indicated at 56, and comprising in this instance about a third of the length of the entire rolls, is desirably of softer character and may consist, for example, of mixed bristles of Tampico fiber and horse-hair as before described. The entire length of the brush rolls of this unit 54 may be approximately 12 feet in a typical instance; although it is to be understood that all dimensions herein referred to are susceptible of variation without departing from the scope of the invention. For a reason that will appear presently, it is desirable to provide the unit 54 with two applicator devices 57 and 58 of the same general type as that employed with unit 50 previously described. The first of these in sequence, that indicated at 57, is best located substantially at the upper end of the inclined brush rolls of the unit; while the other, 58, is advantageously located adjacent the lower end of the Tampico fiber section 55 of the rolls just in advance of the softer brush sections 56. For a purpose that will presently appear, the unit 54 may also be advantageously provided with means for showering washing oil down upon the fruit as it travels along the brush rolls adjacent the upper or receiving ends thereof. For this purpose a pump and spray system, similar to that employed in conjunction with the brush rolls 10 of Fig. 1, may be used, such system being here shown as including supply tank 59, valved nozzles or pet-cocks 60, drip-tank 61, pump 62, and return-pipe 63.

From the lower or delivery end of the finishing unit 54, the fruit may follow either one or two paths. It may go by way of elevator 64 to drier 65, which may be of the well-known roller-belt conveyor type; and thence to the grading belt 66 from which the graded fruit goes to sizing apparatus, not shown. Alternatively, and in many cases preferably, the fruit leaving unit 54 does not go through the drier but passes directly by way of conveyor belt 67 to the grading belt 66 before mentioned, the arrangement being such that fruit can be delivered either to the elevator 59 or to the belt conveyor 67, as desired, with very slight adjustment of the mechanism in question. For example, the side 68 of chute board 69 may be removable and a deflector 70, shown in dotted lines placed on said board to divert fruit to belt 67 and thus by-pass the drier.

Assume now that fruit, such as oranges or the like, that is merely dusty but carries no tenaciously adherent foreign matter such as scale, smudge, or the like, is to be treated in the apparatus system shown in Figs. 2 and 3. Such fruit will ordinarily not require cleansing with a non-aqueous liquid medium but requires only to be thoroughly rubbed or brushed to sufficiently free the rind or skin of dirt. Accordingly, applicator roll 52 is lowered and remains idle. The applicator roll of device 57, however, is adjusted for engagement with one or more of the brush rolls of unit 54 in order that a coating composition, comprising wholly or chiefly a mixture of paraffin or the like and a non-aqueous vehicle such as the light oil fraction before mentioned, for example, may be applied to the upper end of said brush rolls. Such mixture may be of medium thick consistency, say 45 to 55 per cent paraffine by volume. The applicator roll of device 58 is lowered and remains idle under the conditions assumed. Fruit as received at the packing house is delivered to the upper end of the inclined roll of unit 50 and is thoroughly rubbed and brushed as it passes down along the rolls with the result that it is freed from dust and other foreign matter to the necessary extent. Most desirably the unit 50 has a housing 71 and collecting hopper 72 from which a fan 43 draws dust and dirt and discharges same to any convenient point; all substantially as described in connection with the rolls 10 shown in Fig. 1. The dusted fruit delivered from unit 50 may then pass by way of the conveyor 53 to the finishing unit 54; although, if desired, a suitable chute or bridging device, (not shown) may be interposed between units 50 and 54 to enable direct delivery of the fruit to unit 54 without its having to travel the circuitous route provided by conveyor 53. In either case, the fruit upon being delivered to unit 54 is immediately smeared with the more or less fluid coating composition applied to the brush rolls through the agency of the applicator device 57, and this composition is thoroughly and uniformly distributed over the fruit as it passes down the runway or runways between the brush rolls, the lower sections 56 of which serve to finish and smooth the film-like coating on the fruit and to wipe off any unnecessary surplus. If the fruit delivered from unit 54 is passed through the drier 65, a certain amount of the hydrocarbon or other solvent undergoes evaporation therein, after which the fruit is delivered to the grading belt 66, as before stated. On the other hand, if the fruit is delivered by unit 54 to the conveyor belt 67, a certain amount of evaporation may occur while the fruit is traveling on said belt and before it reaches the grading belt. In either case, the extent of evaporation will depend largely upon the volatility of the hydrocarbon or other non-aqueous solvent employed; and, in the case of a solvent such as the special oil fraction hereinbefore described, or a solvent having similar desirable properties, it is not essential, as already pointed out, that complete evaporation be effected before the fruit reaches the grading belt.

Where the fruit carries considerable foreign matter that adheres firmly to the fruit rind or skin, as in the case of scaly or smudged fruit, the best procedure is to treat the fruit immediately with a non-aqueous liquid cleansing medium and then, after the lapse of a suitable interval of time, to complete the cleansing and finish the preservative treatment. Accordingly, where the apparatus of Figs. 2 and 3 is employed to accomplish this, applicator roll 52 is raised into engagement with the brushing rolls of unit 50 in order to transfer thereto the non-aqueous medium. The applicator roll of device 57 is lowered out of engagement with brush roll section 55 and remains idle; while the applicator roll of device 58 is raised into engagement with the brush roll section 56 in order that a fresh supply of coating material may be supplied to said rolls to provide a finishing coat on the fruit. Under these conditions the fruit to be treated receives a liberal coating of the non-aqueous washing medium in going through the unit 50, a certain amount of paraffin being most desirably mixed with the light oil to provide a thinly fluid washing medium as already described. This mixture is smeared and rubbed thoroughly over the fruit by the brushes of unit 50, and the fruit is then delivered to the conveyor belt 53 upon which it rests quietly and by which it is conveyed and delivered eventually to unit 54. The period of time elapsing between the exit of the fruit from unit 50 and its delivery to unit 54 may vary considerably depending upon the character and dirtiness of the fruit; but in a typical instance it amounts to about seven minutes. During this time the kerosene or other solvent employed has an opportunity to cut or dissolve the foreign matter on the fruit rind so that it is easily removable by the relatively stiff fiber bristles of the upper brush-roll sections 55 of unit 54. Where the fruit is very dirty, it is of advantage to shower it with washing oil, or a thin mixture thereof with paraffin, just as it begins its travel down the brush rolls of unit 54. This often materially facilitates complete cleansing of the fruit by said rolls. By the time the fruit arrives at the lower end of brush roll sections 55, it is clean and bright. Under the conditions of operation assumed, it also retains a thin coating or film of paraffin admixed with more or less solvent; and in fact no further application of preservative material is necessary in all cases, strictly speaking. However I have found it advantageous in most instances to apply more coating composition at this point and this can be conveniently effected by means of the applicator device 58, the applicator roll of which has been placed in engagement with the brush rolls under the conditions assumed. The fresh coating composition thus applied at this stage, which may advantageously be of relatively thick consistency, is thoroughly wiped and uniformly distributed over the surface of the fruit by the action of the lower brushing sections 56 which are softer or more yielding than the sections 55, as already explained. The course of the fruit after leaving the unit 54 may be either through the drier or direct to the grading belt, as in the previous example given.

If desired, the lower brush roll sections 56 may be enclosed in a housing 74 in which are provided suitable heating means, such as steam coil 75, for example, whereby the final or finishing rubbing of the coated fruit may be conducted at a temperature above atmospheric. In a typical instance the temperature in the housing may be 130°–140° F. This aids in obtaining a very thin uniform coating of paraffin on the fruit, and also enables a higher polish to be obtained. This is attributable in part to the fact that when heat is used, the brushes 56 stay cleaner and therefore have a more efficient wiping and rubbing action on the fruit.

It may be noted that when any of the applicator devices are idle, they can be removed from under their respective brush rolls, provision being made for accomplishing this readily.

The application of coating material to the fruit at two different stages as in the example just given, that is, first by the applicator device 51—52 in connection with the preliminary cleansing, and second by the applicator device 58 after completion of the cleansing, has certain very important advantages. I have found that the paraffin contaned in the thin mixture applied to the fruit in unit 50, aside from any other advantageous influence it may have, fills or seals the pores of the fruit skin or rind in such manner that the fruit is at once provided with a protective coating of the inert or inactive paraffin which is effective to render the fruit substantially insensitive or unaffected by coating or preservative agents that may subsequently be applied, which agents would in some cases have an injurious or deteriorating effect upon the fruit if they were applied thereto directly without the interposition of the inert paraffin coating. This makes it possible to employ in the applicator device 58 a coating composition that includes ingredients, such as rosin or the like, adapted to enhance the finish or polish produced on the fruit in the finishing operation without fear of adversely affecting the fruit thereby. It also enables the use in such coating composition of a solvent of much higher volatility, such as gasoline or the like, than it is ordinarily advisable to use in the first application of coating composition to the fruit. This is of some practical importance where it is deemed desirable in a particular instance to more rapidly or completely free the preservative coating from solvent before it goes to the grading belt. It is to be observed that this result is due not merely to the higher volatility of the second or lighter solvent per se, but also to the fact that, in evaporating, the more volatile solvent mechanically carries off with it a substantial portion of the residual heavier solvent previously applied to the fruit.

If for any reason it may be desired to wash fruit with water, the fruit coming from the brush rolls of an ordinary standard water washer, indicated conventionally at 76, is transferred by elevator 64 to the drier 65, through which it passes and is discharged by way of chute board and deflector 78 (shown in dotted lines) to conveyor belt system 79 which carries it to the head or upper end of unit 50, the fruit then being handled by units 50, 53 and 54 as already described for the handling of relatively clean fruit, that is, applicator 57 being used with a mixture of medium consistency, the other two applicators being idle, and the fruit discharged from unit 54 being diverted by deflector 70 to conveyor belt 67 which takes it to the grading belt. Or, water-washed fruit carried from the drier by belt 79 may be taken directly to the head of unit 54 without being handled by units 50 and 53. Again, the fruit coming from the drier may go to unit 50 and then be diverted from the discharge end thereof direct to the grading belt without going through units 53 and 54; but in that case applicator 51—52 is used to apply the coating composition to the fruit.

For certain purposes, and especially in the treatment of pears and apples, I find that especially good results can be obtained by using a coating composition comprising paraffin and an oil which, although still fairly light, is somewhat heavier than the fraction particularly referred to hereinabove. For example, a colorless tasteless and odorless mineral oil having, in a typical instance, the following characteristics gives excellent results:

Specific gravity, 0.840.
Viscosity at 100° F., 70–73 seconds (Saybolt).
Flash point, 340°–350° F.
Initial boiling point, 600° F.
End boiling point, 745° F.

Using such an oil, a typical mixture for coating pears may consist of 30 to 40 per cent of paraffine by volume. It will be noted that the viscosity of this oil is exceptionally low for an oil having the other characteristics above mentioned, and that, like the lighter oil fraction whose constants have been set forth hereinbefore, its distillation temperature range is comparatively narrow. These characteristics in an oil are of special advantage for purposes of the present invention.

I have found that the paraffine, which is the waxy material most commonly used by me in the coating composition, should be of the highest degree of purity for attainment of best results in preservatively coating fruit. So-called refined paraffine, obtainable commercially as "slab" paraffine at a few cents per pound, while capable of use in this connection with a fair degree of success in many cases, gives a more brittle and somewhat less closely adherent film coating on fruit than does the highest grade of paraffine, such as the product commercially known as "Parawax", which has been refined to a much greater extent. Accordingly, although the cost of the highly refined wax is much greater, it is preferred in the practice of my invention because of the superior results thereby attainable. I find also that a wax of rather low melting point, say about 118° F., gives a coating composition or emulsion that spreads especially well and produces a film coating on fruit that is particularly satisfactory in character.

The form of apparatus illustrated in side elevation in Fig. 4 is also convenient for use in practicing my novel process of waterless washing and also coating fruit, especially when the fruit is not excessively dirty. In this arrangement, all the necessary operations can be effected in proper sequence by means of a unitary brush roll construction which, in its general character, is similar to ordinary washers and polishers but is much elongated and is equipped with accessory parts that render it operative to carry out the process aforesaid. Fruit as delivered to the packing house is fed over the chute board 80 to the upper end of the inclined brush roll mechanism and entering the dust housing 81 through flexible entrance 82 passes down along the first or dusting section 83 of the brush rolls, the brushing surfaces of which are desirably of mixed Tampico fiber and horsehair. This section may be 5 to 6 feet long in a typical instance. Dust and dirt fall into hopper 84 and are withdrawn and discharged by fan 85. Leaving the dusting section through flexible exit 86, the fruit next passes over a brush roll section 87 that is relatively long, say 10 to 12 feet, and most desirably composed of Tampico fiber. Just as the fruit enters this section, a washing oil is showered upon it by the spray system indicated generally at 88 and similar to those described in connection with the apparatus Figs. 1, 2 and 3. After being thus showered with solvent, the fruit continues to travel down along this Tampico fiber section, being turned over and over and thoroughly rubbed and scrubbed meanwhile. After an interval of time during which the oil has a chance to cut and loosen scale and smudge, which is dislodged and thrown off the fruit by the brushes to a considerable extent, the fruit arrives at the lower part of section 87, and a quantity of a fairly thick mixture of paraffine and light mineral oil, which may be the same as the oil used for washing, is applied to the fruit through the operation of applicator device 89, which may be like those already described. As the fruit continues on down the rolls and through the third or finishing brush roll section 90, which is relatively short, say 4 or 5 feet for example, and composed of mixed Tampico and horsehair, it gets a thorough wiping and rubbing that removes the loosened scale etc., along with any excess coating composition; so that when the fruit leaves the lower end of the apparatus, it is bright and clean and has a thin film coating of paraffine. The fruit may either go direct to the grading belt or first through a solvent evaporator, as desired.

Figs. 5, 6 and 7 illustrate in detail means for ensuring that the fruit as it passes down the runways between the cooperating brush rolls shall be compelled to change its axis of rotation continually and shall receive a thorough rubbing or scrubbing in its travel. As shown in Fig. 5, the brush rolls all rotate in the same direction. Above each brush roll and located in a vertical plane slightly off-center, that is, beyond the vertical plane passing through the brush roll axis, is stationarily mounted what may be called a dividing board 91 extending in the present instance the full length of the brush roll. On the side of the dividing board toward which the brush roll advances, that is, on the left hand side as shown in Fig. 5, each dividing board is provided near its lower edge with a brushing surface 91$^a$ of suitable bristles. Attached along the lower edge of the opposite or right hand side of each of these dividing boards are a series of flap devices 92 of suitable flexible material of some kind, heavy textile material such as canvas belting being suitable for this purpose. As shown more clearly in Fig. 6, these flap devices 92 are arranged in series along the length of the runway formed by each cooperating pair of brush rolls, each flap overlying the runway and having one edge tacked or otherwise secured to the smooth face of a separating board 91 along its lower edge as indicated at 93, while the other edge 4 is entirely free save that the free corner 95 of the advance or upper end of each flap is turned back across the runway and tacked or otherwise secured to the plain side of the cooperating separating board 91 but near the upper edge of the latter. By advance or upper end of the flap is meant the end toward the upper end of the inclined brush rolls, or the end of the flap which the fruit first encounters as it travels down the rolls. In Fig. 3 the direction of fruit travel is indicated by the arrow 96 and the direction of roll rotation by the arrow 97. It will be seen that the rotation of the rolls tends to keep the flap extended across the runway with its free edge closely adjacent the brush surface 91$^a$ of the next succeeding separating board; while the turned-back corner 95 of the upper end of the flap allows fruit coming down the runway to get under the flap. Furthermore, the turning back of the flap corner 95 exerts a certain amount of yielding pressure on the flap lying over the runway, the extent of this pressure depending upon the stiffness of the flap material and the extent to which the corner is turned back, this latter factor providing means for regulating or adjusting the flap pressure on the fruit. The flaps in each runway are arranged in fairly close succession with but little space between any two flaps. The described arrangement operates substantially as follows: A fruit such as an orange coming down the runway is advanced under the upturned corner of the flap by the action of the spirals on the brush roll. The pressure of the flap on the fruit acts like a brake to check the spinning of the orange which is imparted to it by the rotation of the cooperating brush rolls and which has a tendency to occur principally on a single axis passing more or less approximately through the stem and blossom end of the fruit. This braking action causes the orange to climb the right hand brush roll, viewing the fruit as it travels down the runway from a point of observation higher up along the brush rolls. The orange climbs the right hand brush roll until it strikes the stationary brushing surfaces 91$^a$ of the next succeeding dividing board, at which time the orange is substantially at the crest of the brush roll and is held there by the action of the flap. The brush roll, however, continues to advance the orange longitudinally of the runway, and this, in conjunction with the retarding action of the stationary brush surface 91$^a$ on the orange, changes the axis of rotation thereof and ensures its getting a thorough rubbing and scrubbing. When the orange reaches the lower end of the flap, the pressure on it is momentarily released and it drops back down into the valley between the brush rolls forming that runway; but it then goes under the upturned corner of the next succeeding flap 92 and is again compelled to climb the right hand brush roll as before described. It is to be noted that the flaps, besides compelling the fruit to climb the brush roll as described, themselves also exercise a rubbing action on the fruit. If, as may sometimes happen, the fruit crowds down the runway so fast that an occasional fruit fails to get under the upturned corner of a particular flap, this does no harm because such fruit simply travels down above the flap and subjects the fruit below the same to an additional and variable braking pressure which is advantageous rather than otherwise. The arrangement here shown and explained therefore provides particularly efficient means for securing effective brushing and rubbing action on the fruit, and the same constitutes an important feature of the invention in its more specific aspects, so far as concerns apparatus.

While the described arrangement of separating or dividing boards and pressure flaps has been described more particularly in connection with the apparatus shown in Figs. 4, 5 and 6, it may advantageously be used in the previously described types of apparatus illustrated in Figs. 1, 2 and 3, and is actually so used in practice. Said arrangement is not illustrated in Figs. 1, 2 and 3 in order to avoid complicating those drawings.

Among the many advantageous results flowing from the process of the present invention may be mentioned the possibility of dispensing altogether with the expensive methods of shipping citrus and other fruits to market heretofore universally practiced. Fruit treated in accordance with the present process does not have to be wrapped in tissue paper or carefully packed in boxes in order to get it to market in good condition. On the contrary, it can be shipped in bulk, without refrigeration, and arrives at distant markets in sound and plump condition, with freshness and flavor unimpaired even after several weeks' travel. This makes possible an entirely new system of distribution that eliminates not only the costly wrapping and boxing of fruit at the packing house, but also the costly handling by middlemen at the marketing points, and makes it possible to get fruit of the highest quality into the hands of the ultimate consumer at a cost materially below the present cost of fruit that is often of very inferior quality.

It will be understood that the invention is not limited to the details of apparatus and procedure hereinbefore disclosed but is broad in scope, contemplating a wide variety of changes that it is evidently possible to make without departing from the fundamental principles upon which the invention is based.

In compliance with an official requirement for division, the novel apparatus herein disclosed has been made the subject matter of a divisional application, Serial No. 661,318, filed September 6, 1923.

What I claim is:

1. The process of preparing fruit for market without the use of water which comprises brushing or otherwise rubbing the fruit with non-aqueous liquid material to remove foreign matter therefrom.

2. The process of preparing fruit for market without the use of water which comprises cleansing the same from foreign matter by brushing the surface of the fruit while spraying a non-aqueous liquid thereupon.

3. The process of preparing fruit for market which comprises washing the fruit with a mineral oil to remove foreign matter therefrom.

4. The process of preparing fruit for market which comprises washing the fruit with a mineral oil fraction to remove foreign matter therefrom, said fraction having a distillation temperature range approximating that of kerosene.

5. The process of preparing fruit for market which comprises removing scale or other foreign matter from fruit with the aid of a non-aqueous liquid and spreading over the surface of the fruit a thin coating of protective material associated with said liquid.

6. The process of preparing fruit for market which comprises removing scale or other foreign matter from fruit with the aid of a relatively light mineral oil and spreading over the surface of the fruit a thin film-like protective coating of waxy material in mixture with said oil.

7. The process of preparing fruit for market without the use of water which comprises applying thereto a light oil having a solvent or cutting action on scale, smudge and the like, and then rubbing the fruit.

In testimony whereof I hereunto affix my signature.

ERNEST M. BROGDEN.